(12) United States Patent
Chen

(10) Patent No.: US 7,347,407 B2
(45) Date of Patent: Mar. 25, 2008

(54) ROTATION SPEED REGULATING MECHANISM FOR PNEUMATIC TOOLS

(75) Inventor: Lung-Hui Chen, Zhubei (TW)

(73) Assignee: Sunmatch Industrial Co., Ltd., Zhubei (TW)

( * ) Notice: Subject to any disclaimer, the term of this patent is extended or adjusted under 35 U.S.C. 154(b) by 507 days.

(21) Appl. No.: 11/103,507

(22) Filed: Apr. 12, 2005

(65) Prior Publication Data
US 2005/0230655 A1 Oct. 20, 2005

(30) Foreign Application Priority Data
Apr. 15, 2004 (TW) .............................. 93205776 U

(51) Int. Cl.
*F16K 5/10* (2006.01)
(52) U.S. Cl. ...................... 251/208; 173/169; 251/346; 251/351
(58) Field of Classification Search ................ 251/208, 251/304, 351, 149.2, 149.5, 346; 173/169
See application file for complete search history.

(56) References Cited

U.S. PATENT DOCUMENTS

| 3,989,113 | A | * | 11/1976 | Spring et al. | 173/169 |
| 4,022,422 | A | * | 5/1977 | Stone | 251/351 |
| 4,470,577 | A | * | 9/1984 | Warwick | 251/351 |
| 4,807,847 | A | * | 2/1989 | Martz | 251/351 |
| 5,547,166 | A | * | 8/1996 | Engdahl | 251/149.6 |
| 5,941,503 | A | * | 8/1999 | Niakan et al. | 251/208 |
| 6,196,477 | B1 | * | 3/2001 | Halltorp et al. | 251/346 |
| 6,843,466 | B1 | * | 1/2005 | Chuang | 251/207 |

* cited by examiner

*Primary Examiner*—John Bastianelli
(74) *Attorney, Agent, or Firm*—Birch, Stewart, Kolasch & Birch, LLP

(57) ABSTRACT

A rotation speed regulating mechanism for pneumatic tools includes a movable airflow knob coupled on the periphery of an air intake member through screw threads. The airflow knob can be turned to adjust the size of an air inlet of the air intake member in a stepless fashion to regulate airflow entering an pneumatic tool so that the rotation speed of the pneumatic tool may be regulated in a stepless manner. Use of the pneumatic tool is more effective and convenient.

2 Claims, 4 Drawing Sheets

ROTATION SPEED REGULATING MECHANISM FOR PNEUMATIC TOOLS

FIELD OF THE INVENTION

The present invention relates to a structure for pneumatic tools and particularly to a rotation speed regulating mechanism for pneumatic tools.

BACKGROUND OF THE INVENTION

In the conventional pneumatic tools the techniques of regulating the rotation speed of the rotor in the air chamber by controlling airflow are known in art. They mostly use a valve lever to control the airflow entering the air chamber. The mechanism generally is formed with a special shape. Hence it is difficult to maintain a consistent quality during manufacturing, and the accuracy to regulate the airflow is affected.

There is another type of control mechanism to regulate the rotation speed of the pneumatic tools that adjusts the size of the air inlet through different sizes of ports. The ports are formed on an airflow knob may be used to achieve different rotation speeds of the rotor. The sizes of the ports are preset. Hence the rotation speed of the rotor is limited to a preset range and cannot offer a stepless regulation. All these hinder the use effectiveness of the pneumatic tools.

SUMMARY OF THE INVENTION

Therefore the primary object of the present invention is to provide a regulating mechanism for pneumatic tools to adjust rotation speed in a stepless manner. An air intake member is provided which has an air inlet adjustable in a stepless fashion to control airflow entering the pneumatic tools.

In order to achieve the foregoing object, the rotation speed regulating mechanism according to the invention includes an air intake member which has a hollow element, an air outlet end extended axially from one end and an air inlet end extended axially from another end thereof. The air outlet end and the air inlet end do not communicate with each other from the distal ends thereof. There is an air regulation port and an air inlet that communicate radially with the air outlet end and the air inlet end through the air intake member. An airflow knob is provided which has an annular sleeve coupling with the air intake member coaxially through a screw thread such that it can be moved relative to the air intake member to selectively cover the air regulation port thereby to regulate the airflow. A shell is provided to encase the air intake member and the annular sleeve that has an inner passage to communicate with the air regulation port and the air inlet from outside, and isolate the air intake member and the annular sleeve from the ambience.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
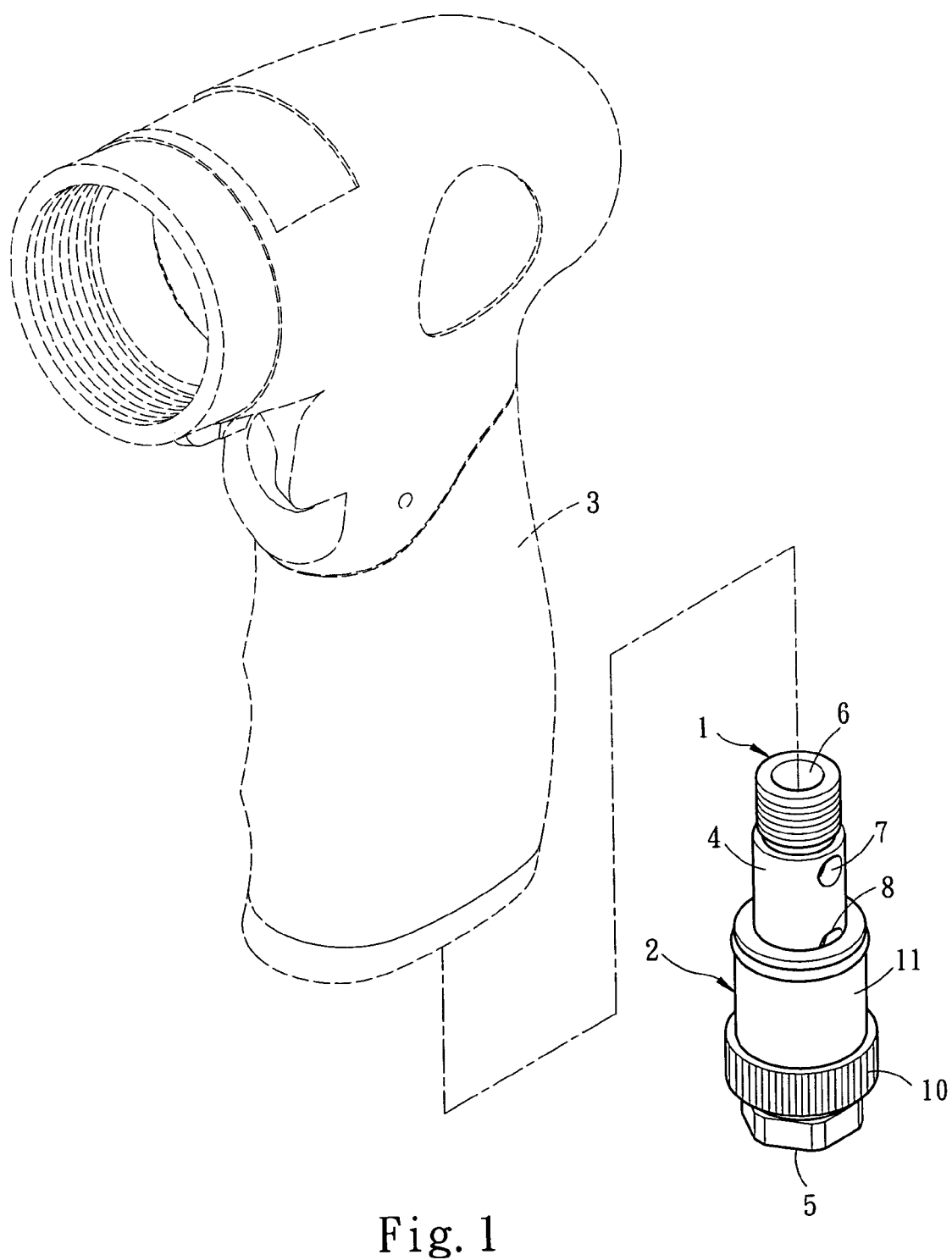
FIG. 1 is a perspective view of an embodiment of the present invention.

Please refer to FIG. 1 for a perspective of an embodiment of the invention. The rotation speed regulating mechanism for pneumatic tools according to the invention includes an air intake member 1, an airflow knob 2 and a shell 3.

Figure 2:
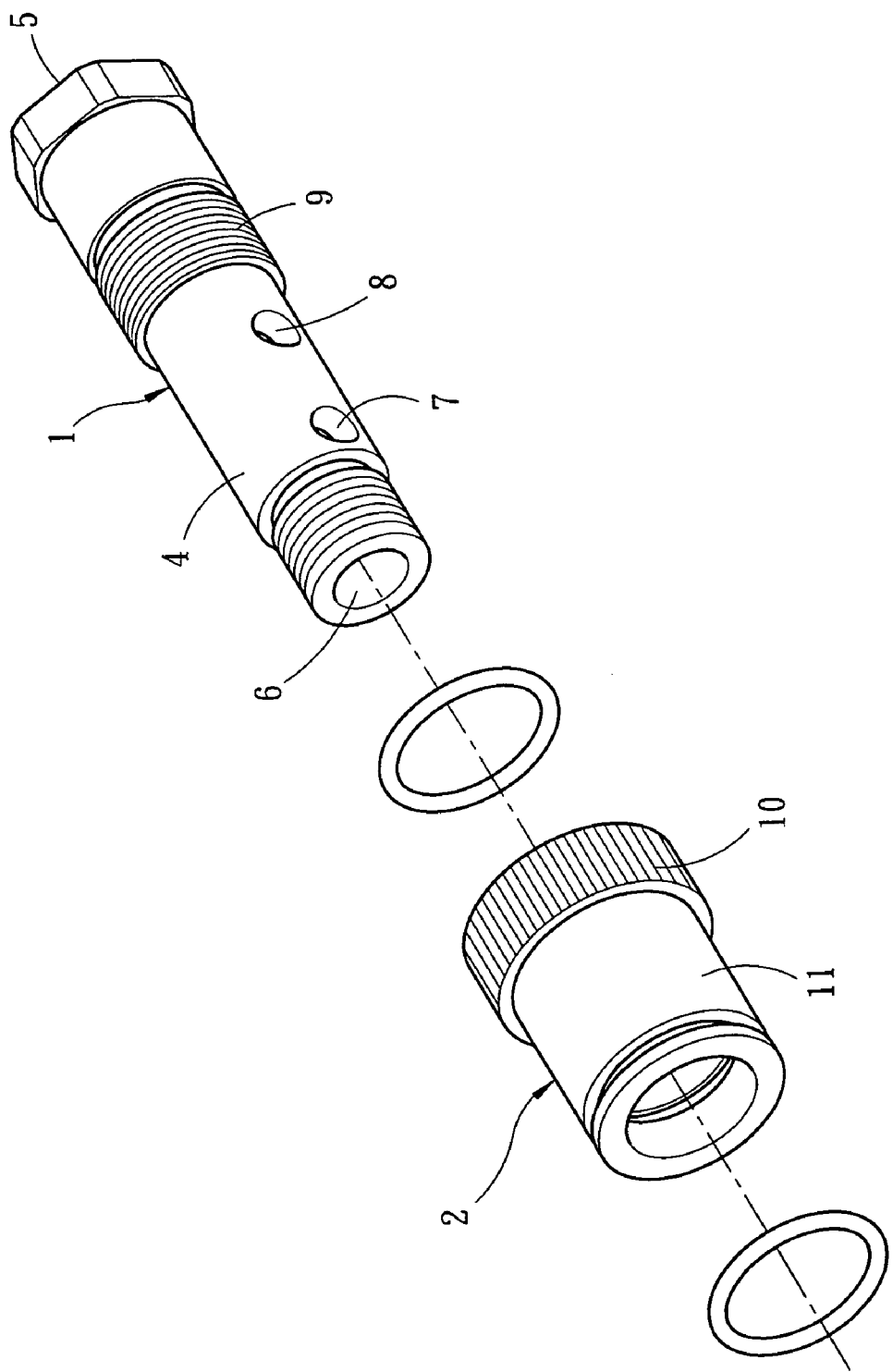
FIG. 2 is an exploded view of an embodiment of the present invention.

Refer to FIG. 2 for an exploded view of an embodiment of the invention. The air intake member 1 includes a hollow element 4, an air inlet end 5 extended axially from one end and an air outlet end 6 extended axially from another end thereof. The air inlet end 5 and the air outlet end 6 do not communicate with each other from distal ends thereof. There is an air inlet 7 running through the distal end of the air outlet end 6 vertical to the side wall of air intake member 1, and an air regulation port 8 running through another distal end extended from the air inlet end 5 vertical to the side wall of air intake member 1 and parallel with the air inlet 7. The air regulation port 8 and the air inlet 7, incorporated with the air inlet end 5 and air outlet end 6, communicate with each other on the outside of the air intake member 1 by coupling with the shell 3. The air intake member 1 has an external screw thread 9 (may be a single thread or multiple threads) on the peripheral surface which can screw with an internal screw thread 14 (as shown in FIG. 3B may be a single thread or multiple threads) of the rotary annular sleeve 10.

The airflow knob 2 has an annular sleeve 11 and a rotary annular sleeve 10 that are connected coaxially and coupled coaxially with the air intake member 1. The rotary annular sleeve 10 has the internal screw thread 14 (may be a single thread or multiple threads) screwing with the external screw thread 9 of the air intake member 1. By rotating the rotary annular sleeve 10, the annular sleeve 11 can be moved to partly or fully cover the air regulation port 8.

The shell 3 generally is the handle of a pneumatic tool to encase the air intake member 1 and the annular sleeve 11 and forms a gap 12 with the air intake member 1. The shell 3 and the air intake member 1 are fixedly coupled to isolate the gap 12 from the ambience for receiving airflow 13.

Figure 3A:
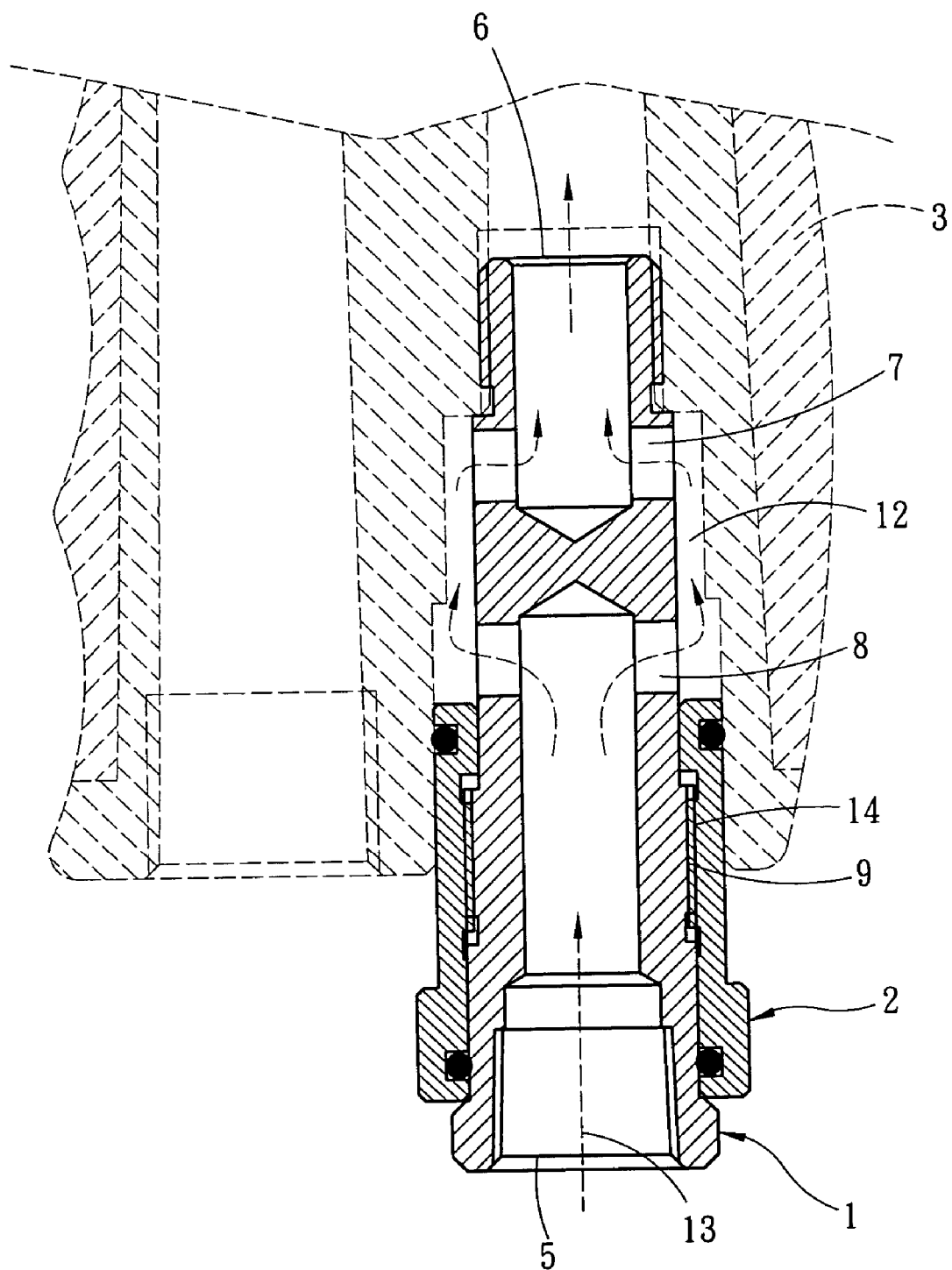
FIG. 3A is a sectional view of an embodiment of the present invention in a maximum rotation condition.
Figure 3B:
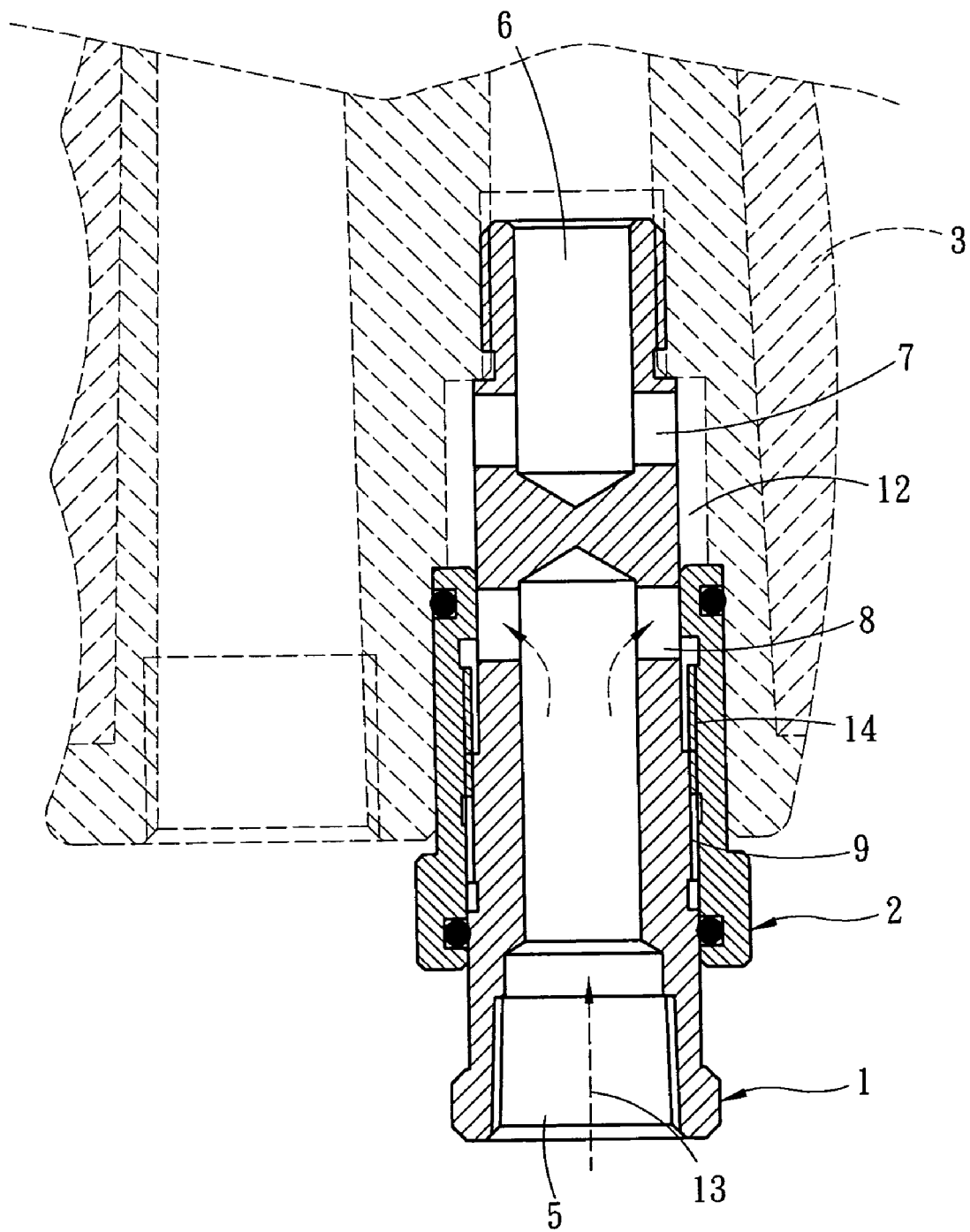
FIG. 3B is a sectional view of an embodiment of the present invention in a rotation stop condition.

Refer to FIG. 3A for a sectional view of the invention in the maximum rotation speed condition. The airflow 13 enters the rotation speed regulating mechanism through the air inlet end 5. The airflow knob 2 does not cover any portion of the air regulation port 8. Thus the airflow 13 can flow through the air regulation port 8 to the air inlet 7 and is discharged through the air outlet end 6 to drive the pneumatic rotor of the pneumatic tool (not shown in the drawings) to rotate at full speed.

Refer to FIG. 3B for a sectional view of the invention in a rotation stop condition. The airflow 13 enters the rotation speed regulating mechanism through the air inlet end 5. But the airflow knob 2 fully covers the air regulation port 8. Thus the airflow 13 cannot flow through the air regulation port 8 to drive the pneumatic rotor of the pneumatic tool. Therefore, by turning the airflow knob 2 to move relative to the air intake member 1 through the screw thread, the air regulation port 8 may be selectively covered at a range desired to adjust the airflow 13 passing through and regulate the rotation speed of the pneumatic tool in a stepless fashion. As a result, use of the pneumatic tool is more effective and convenient.

While the preferred embodiment of the invention has been set forth for the purpose of disclosure, modifications of the disclosed embodiment of the invention as well as other embodiments thereof may occur to those skilled in the art.

Accordingly, the appended claims are intended to cover all embodiments which do not depart from the spirit and scope of the invention.

What is claimed is:

1. A rotation speed regulating mechanism for pneumatic tools, comprising:

an air intake member which includes a hollow element, an air outlet end extended axially from one end, an air inlet end extended axially from another end thereof, an air regulation port and an air inlet, the air outlet end and the air inlet end being not communicating with each other from distal ends thereof, the air regulation port and the air inlet being formed radially to communicate with the air inlet end and the air outlet end, the air intake member further having an external screw thread on the periphery thereof;

an airflow knob having an annular sleeve which has an internal screw thread to couple with the external screw thread of the air intake member to move the annular sleeve relative to the air intake member for adjusting covering range of the air regulation port and regulating airflow passing through the air regulation port to regulate rotation speed in a stepless fashion; and a shell fixedly coupled on an outer side of the air intake member to encase the air intake member and the annular sleeve and form a gap between the shell and the air intake member to receive the airflow.

2. The rotation speed regulating mechanism of claim 1, wherein the internal screw thread and the external screw thread are a single thread.

\* \* \* \* \*